UNITED STATES PATENT OFFICE.

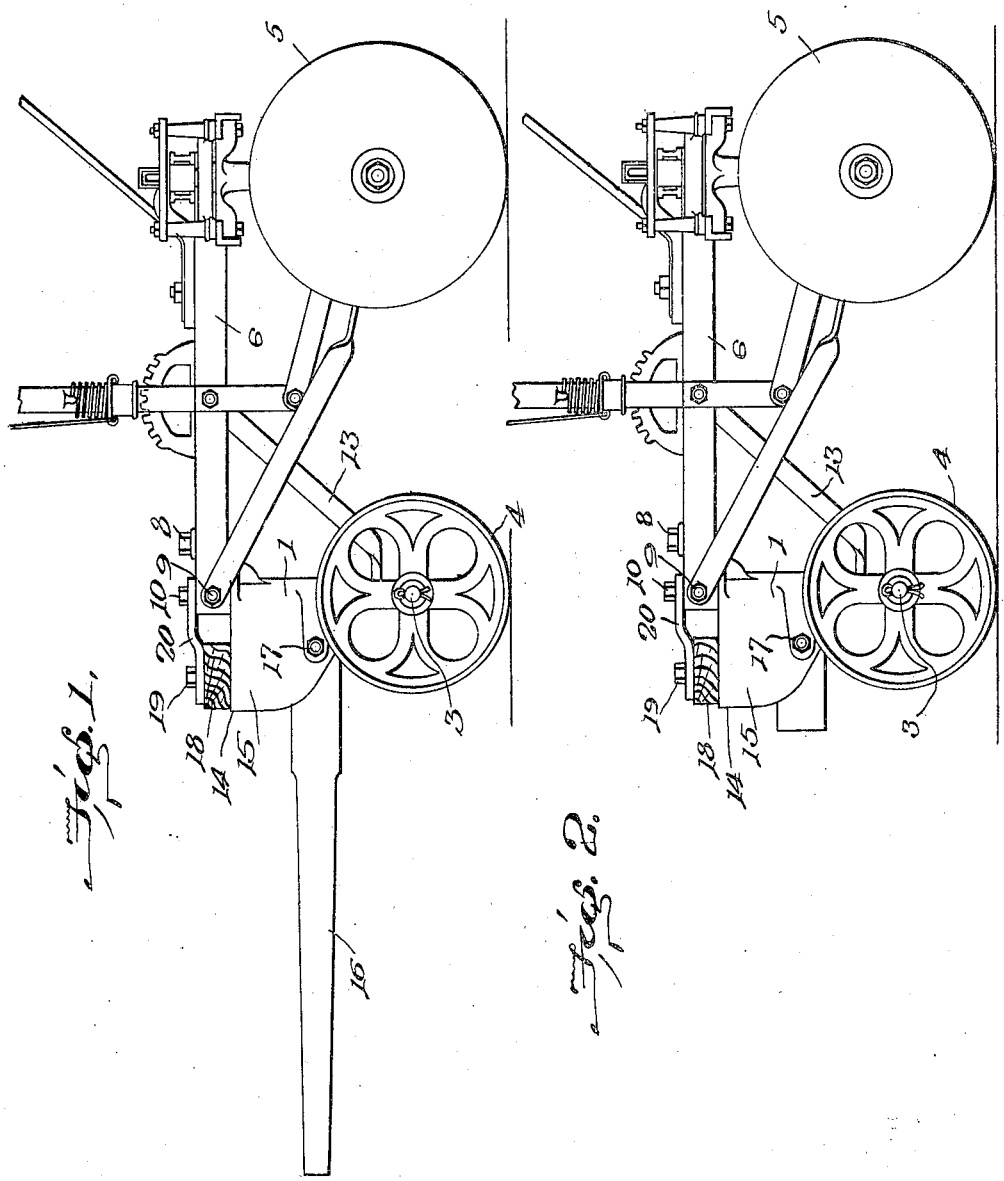

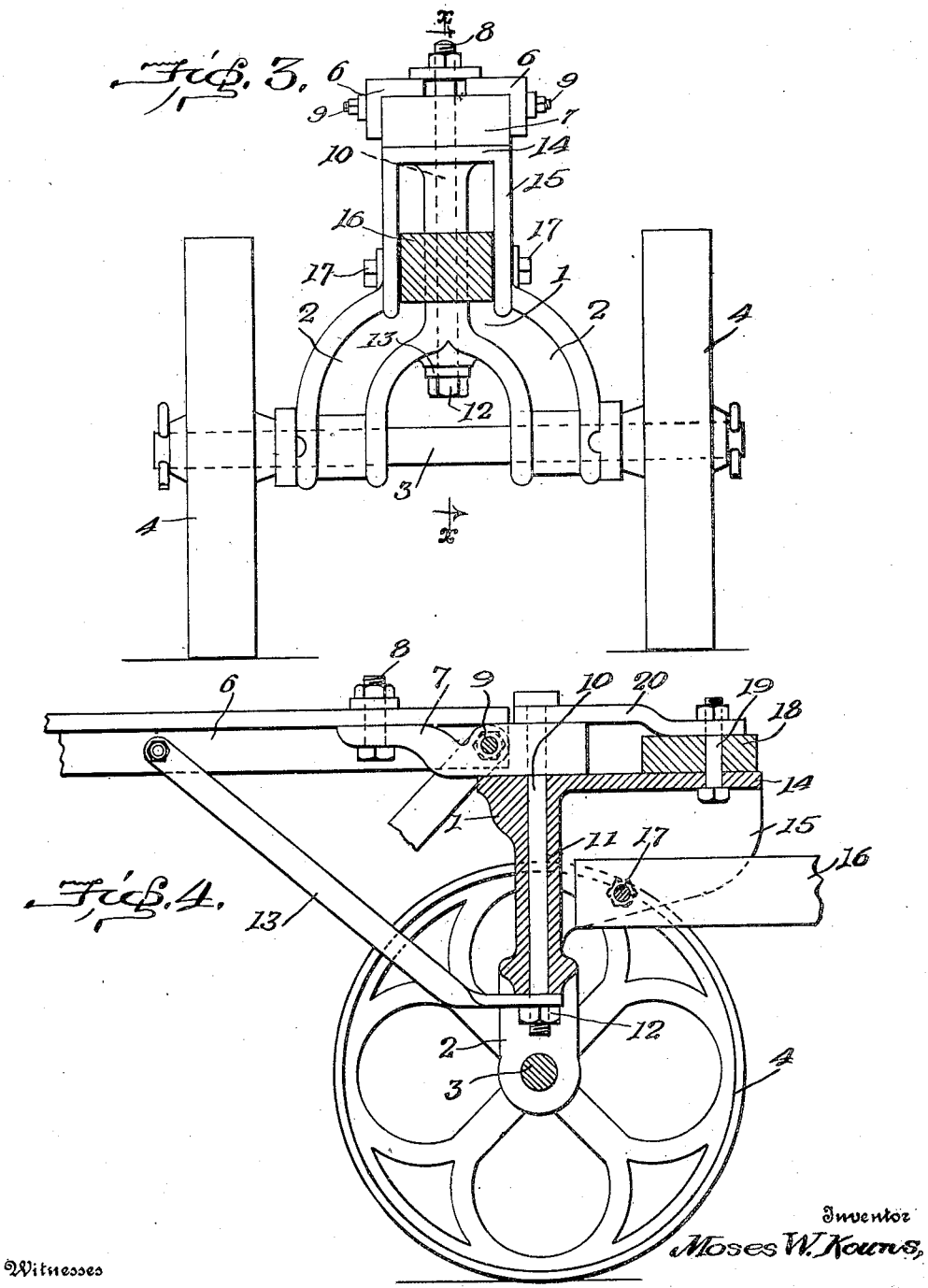

MOSES W. KOUNS, OF COLUMBUS, OHIO, ASSIGNOR TO THE OHIO MANUFACTURING COMPANY, OF UPPER SANDUSKY, OHIO, AN OHIO CORPORATION.

TONGUE-TRUCK FOR DISK HARROWS.

No. 889,933.     Specification of Letters Patent.     Patented June 9, 1908.

Application filed June 24, 1907. Serial No. 380,394.

*To all whom it may concern:*

Be it known that I, MOSES W. KOUNS, a citizen of the United States, residing at Columbus, in the county of Franklin and State of Ohio, have invented certain new and useful Improvements in Tongue-Trucks for Disk Harrows, of which the following is a specification, reference being had therein to the accompanying drawings.

The present invention relates to tongue trucks for disk harrows and implements of a similar character.

The object of the invention is to provide a truck of this character which can be used either with or without a tongue, and which, when used without a tongue, will be readily steered by the draft eveners; which will be provided with suitable means for detachably securing the tongue thereto; and which can be strongly braced without interfering with the turning thereof.

With these objects in view my invention consists in certain novel features of construction and in certain parts and combinations hereinafter to be described, and then more particularly pointed out in the claims.

In the accompanying drawings, Figure 1 is a side elevation of a disk harrow equipped with my tongue truck, showing the same provided with the tongue; Fig. 2 is a similar view, showing the truck without the tongue; Fig. 3 is a front elevation of the truck the double-tree and strap being removed; and Fig. 4 is a vertical sectional view, taken on the line *x x* of Fig. 3.

In these drawings, I have illustrated the preferred form of my invention, and, as therein shown, the same consists of a main frame 1 having its lower end bifurcated to form the arms 2, each of which is apertured near its lower end to receive an axle 3 which is secured therein and upon the outer ends of which are journaled the ground wheels 4. The frame 1 may be connected to the disk harrow or other implement in any suitable manner. In the form here shown, I have provided a harrow 5 with a stub tongue 6, preferably consisting of a flanged metal beam extending forwardly from the harrow, and have connected the forward end of this stub tongue to the frame 1. I prefer to form this connection by means of a coupling member or plate 7 which has one end firmly secured to the stub tongue in any suitable manner, as by means of the bolts 8 and 9, and has its forward end projecting beyond the end of said stub tongue and provided with an aperture adapted to receive the upper end of a bolt 10 which extends through a suitable portion of the main frame 1, thereby pivotally connecting said frame to said tongue. I prefer to provide the main frame with a bearing aperture 11 extending vertically through the same and adapted to receive the bolt 10 which extends through the same and is provided at its lower end with a nut 12 for retaining the same in position. A suitable brace 13 preferably extends between the lower portion of the main frame of the truck and the stub tongue 6. I have herein shown the preferred form of this brace which consists of a metal bar secured between the flanges of the stub tongue and having its lower forward end apertured and adapted to engage the lower end of the bolt 10, thus forming a strong brace for the truck and removing the strain from the coupling member 7. This brace being arranged centrally of the truck, does not interfere with the turning of the same.

The main frame 1 is provided with suitable means for detachably securing thereto a tongue. This means preferably consists of a forwardly extending socket which, as here shown, consists of a forwardly extending plate 14 having downwardly extending side members or flanges 15, between which the end of the tongue 16 is secured, preferably by means of a bolt 17 extending through the tongue and through the side members 15 of the socket near the lower edges thereof, thus leaving considerable space between the tongue and the upper plate 14 of the socket and permitting the tongue to be moved vertically about its pivotal center through a considerable space and affording a very easy means for removing and attaching the tongue. The main frame of the truck is preferably provided with suitable draft eveners which may be secured thereto in any suitable manner, but I prefer to secure the draft eveners or doubletrees 18 at a point in front of the main frame, and this I accomplish by securing the same near the outer end of a forwardly extending projection, which projection, in the present instance, is shown as the upper plate 14 of the tongue socket, the draft eveners being pivoted near the forward end thereof by means of a bolt 19 extending through the plate 14 and the eveners 18. A suitable hammer strap 20 engages the upper end of the bolt 19 at one end, as shown, and the upper end of the bolt 10 at the opposite end.

Thus, it will be seen that I have provided a tongue truck of the character described which is readily adapted to be used either with or without a tongue and is provided with a tongue socket within which the tongue may be secured and removed with a slight effort; that I have provided means for attaching the eveners to the truck in such a manner that the truck is readily steered with the eveners alone, this being accomplished by securing the eveners to a forwardly extending projection carried by the main frame of the truck; and further, that I have provided a suitable brace extending between the lower end of the main frame of the truck and a suitable part of the harrow frame, such as the stub tongue, which brace relieves the strain upon the coupling member connecting the stub tongue to the main frame of the truck, and this brace is arranged centrally of the truck and in such relation thereto that the truck can be readily turned about a vertical axis to a sufficient extent for steering the harrow without the wheels coming into contact with the brace.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a tongue truck of the character described, the combination, with an implement to be guided, and a stub tongue therefor, of a frame comprising a vertical standard having a longitudinal bearing extending through the entire length thereof, a connecting bolt mounted in said bearing and having its upper end connected to said stub tongue, a rigid brace having one end connected to the lower end of said bolt and its other end connected to said stub tongue, ground wheels for said frame, a tongue adapted to be secured thereto, and a draft hitch connected to said truck at a point in front of said frame.

2. In a tongue truck, a frame comprising a vertical member having its lower portion bifurcated, a forwardly extending socket secured near the upper end thereof and having its lower portion cut away, a tongue pivotally mounted in said socket, a draft hitch secured to the upper side of said socket near the forward end thereof, and ground wheels supporting said frame.

3. In a tongue truck, an integral frame comprising a vertical standard having a longitudinal aperture, a bifurcated portion, the arms of said bifurcated portion being provided with bearings, an axle mounted in said bearings, ground wheels mounted on said axle, a projection extending forwardly from the upper portion of said vertical standard, downwardly extending side members having their upper edges secured to said projection and their rear edges secured to said vertical standard, a tongue pivoted near the lower edges of said side members, and means for securing a draft hitch to said projection.

In testimony whereof, I affix my signature in presence of two witnesses.

MOSES W. KOUNS.

Witnesses:
 JOHN T. CAREY,
 H. H. NEWELL.